US 7,449,251 B2

(12) United States Patent
Arikawa et al.

(10) Patent No.: US 7,449,251 B2
(45) Date of Patent: Nov. 11, 2008

(54) HEAT RESISTANT ARTICLE HAVING THERMAL BARRIER COATING

(75) Inventors: Hideyuki Arikawa, Mito (JP); Akira Mebata, Kitaibaraki (JP); Yoshitaka Kojima, Hitachi (JP); Kunihiro Ichikawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 99 days.

(21) Appl. No.: 11/006,763

(22) Filed: Dec. 8, 2004

(65) Prior Publication Data

US 2005/0136249 A1 Jun. 23, 2005

(30) Foreign Application Priority Data

Dec. 18, 2003 (JP) ............................. 2003-420281

(51) Int. Cl.
*B32B 5/14* (2006.01)
*B32B 5/18* (2006.01)
*B32B 15/04* (2006.01)
*B32B 15/16* (2006.01)

(52) U.S. Cl. .................. 428/689; 428/334; 428/632; 428/668; 428/680; 428/702; 428/312.8; 427/446; 427/453; 427/454

(58) Field of Classification Search .................. None
See application file for complete search history.

(56) References Cited

U.S. PATENT DOCUMENTS

| 5,073,433 | A | 12/1991 | Taylor |
| 5,520,516 | A | 5/1996 | Taylor et al. |
| 5,630,314 | A * | 5/1997 | Kojima et al. ............ 416/241 B |
| 5,830,586 | A | 11/1998 | Gray et al. |
| 6,047,539 | A | 4/2000 | Farmer |
| 6,180,184 | B1 | 1/2001 | Gray et al. |
| 6,306,517 | B1 | 10/2001 | Gray et al. |
| 6,365,281 | B1 * | 4/2002 | Subramanian et al. ....... 428/472 |
| 2003/0224124 | A1 * | 12/2003 | Lau et al. ..................... 427/454 |
| 2005/0170200 | A1 * | 8/2005 | Nagaraj et al. ............... 428/633 |

FOREIGN PATENT DOCUMENTS

| JP | 58-087273 | 5/1983 |
| JP | 2000-301655 | 10/2000 |
| JP | 2001-329358 | 11/2001 |

* cited by examiner

*Primary Examiner*—Keith D. Hendricks
*Assistant Examiner*—Jason L Savage
(74) *Attorney, Agent, or Firm*—Dickstein Shapiro LLP

(57) ABSTRACT

A thermal barrier coating comprises a bond coating 12 made of high temperature corrosion resistance superior to a substrate 11 and a thermal barrier coating 13 made of ZrO2 series ceramics formed on the bond coating. The thermal barrier coating has cracks extending in the direction of the thickness of the barrier coat. Substantially all of the tips of the cracks have a distance between the tips and the boundary at the substrate side.

20 Claims, 4 Drawing Sheets

HEAT RESISTANT ARTICLE HAVING THERMAL BARRIER COATING

CLAIM OF PRIORITY

The present application claims from Japanese patent application serial No. 2003-420281, filed on 18 Dec. 2003, the content of which is hereby incorporated by reference into this application.

DESCRIPTION OF THE INVENTION

1. Technical Field

The present invention relates to a heat resistant article having a thermal barrier coating and a heat resistant article for gas turbines having the thermal barrier coating.

2. Related Art

In recent years, an operating temperature of a gas turbine is becoming higher and higher for the purpose of increasing efficiency of operation-of the gas turbine. Therefore, durability of high temperature articles such as combustors, turbine blades and nozzles at high temperatures is strongly desired. Under such the background, development of heat resisting alloys having a high strength and high reliability at high temperatures is being progressed. However, there is a limit to a heat resisting temperature. As a method of lowering temperatures of the articles used at high temperatures, there is a thermal barrier coatinging (TBC) of ceramics with a small heat conductivity such as $ZrO_2$ on a heat resisting alloy such as MCrAlY where M is at least one of Co, Ni and Fe through a bond coating or under coat. However, since TBC that is subjected to a harsh heat load condition, there easily occurs damage such as peeling off of the ceramic coat from the substrate.

Particularly, in the gas turbines operated at high temperatures for increasing efficiency, heat load on the gas turbines is very harsh so that the ceramic coat tends to peel off more easily. Since the ceramic layer is less toughness and less strength than the substrate and bond coating, generation and development of cracks or peeling off easily occur due to the linear thermal expansion difference between the substrate or bond coating and ceramic layer or by quick temperature change at the time of start and stop of the gas turbine.

In order to alleviate thermal stress occurring in the ceramic layer, there was proposed a method for extending durability of TBC wherein cracks extending in the direction of the thickness of the ceramics layer are formed. In Japanese Patent Publication 02-51978 for example, the ceramic layer is formed in a low oxygen partial pressure atmosphere at a temperature higher than a re-crystallization temperature of the substrate.

Immediately after the formation of the ceramic layer, a coolant such as gas is blown toward the ceramic layer to quickly cool down it. As a result, cracks are formed in the ceramic coat. In Japanese Patent Laid-open 2001-329358, the back surface of the substrate is cooled down to form cracks in the ceramic coat, while the surface of the substrate is kept at a high temperature.

(Patent document 1) Japanese Patent Publication 02-51978
(Patent document 2) Japanese Patent Laid-open 2001-329358

According to the above-mentioned prior art, introduction of cracks extending in the direction of the thickness of TBC alleviates the generated thermal stress and improves the durability of TBC to some extent. However, in the gas turbines to which a very large thermal load is applied, the above method was not satisfactory. In case of TBC, it is known from the thermal stress analysis that at the time of start and stop of the gas turbines, a compression force is applied to the ceramics coat such as $ZrO_2$ series ceramics with a small linear thermal expansion formed on a substrate with a large linear thermal expansion and an expansion force is applied to the ceramic coat during the time of normal operation.

These thermal stresses exhibit distribution which is the maximum around the boundary between the ceramic top coat and the under coat formed beneath the top coat such as an alloy coat. If the maximum stress value exceeds the strength of the ceramic coat, new initial cracks generate in the ceramic coat, or development of new initial cracks starts from the defects such as cracks or voids in the ceramic coat. Further, the cracks may progress or spread by repetition of compression-expansion stress. This mechanism develops and spreads cracks in the lateral direction i.e. the direction along the layer of the top coat in the ceramic coat. Finally, the peel off or spalling of the ceramic coat occurs.

Conventional TBC with a thickness of 0.2 to 1 mm tends to generate the lateral cracks that cause TBC peel off, which occur within the range of the several micrometers to 100 micrometers from the boundary where the maximum stress occurs in the ceramic coat. Accordingly, in order to improve durability of the ceramic coat of TBC, the prevention of initial cracks generation by a high coat strength and suppression (relaxation of thermal stress or thermal stress relief) of the development of the cracks over the entire area of the ceramic coat by high apparent toughness of the ceramic coat must be compatible.

In the ceramic coats for relaxing the thermal stress, which extend in the direction of thickness of the ceramic coat, a relatively dense ceramic coat is formed by a plasma spray method. This is because the porous coat would not produce a ceramic coat wherein cracks extend in the direction of the thickness of the continuous ceramic coat, even when thermal stress is applied to the ceramic coat. By controlling the heat treatment conditions after formation of the ceramic coat or conditions for forming the ceramic coat such as spray conditions, substrate temperatures, etc, expansion stress is applied to the coat during the formation of the coat or after formation of the coat, whereby the spray coat having cracks extending through the coat in the direction of the thickness of the coat is obtained.

In the relatively dense ceramic layer having the cracks extending in the thickness direction, its strength is higher than the conventional porous ceramic coat, thereby to suppress the generation of cracks. Further, it would be expected that because of the stress relief function of the cracks extending in the thickness direction, development of the cracks may be suppressed. However, it was impossible to prevent the generation of cracks extending in the lateral direction of the coat (along the surface of the coat) together with the cracks extending in the thickness direction. The ceramic coat in the neighborhood of the boundary between the under coat or the bond coating and the coat where the maximum stress occurs, if the cracks extending in the thickness direction are present, they may develop by the repetition of stresses, which leads to peeling off of the ceramic coat.

Further, since the coat has cracks that extend through the thickness of the coat, oxidative and corrosive substances easily arrive at the bond coating through the cracks. As a result, oxides easily grow at the boundary between the ceramic layer and the bond coating. It was also revealed that the grown oxide layer after operation of a long period of time tends to peel off at the boundary of the oxide layer.

As having been discussed, the conventional thermal barrier coating was not sufficient in view points of heat resistance, long term anti-oxidation as heat resistant articles for gas turbines or airplane engines whose operation temperature is extremely high.

SUMMARY OF THE INVENTION

An object of the present invention is to provide heat resistant articles with a thermal barrier coating having heat resisting property, anti-corrosion and anti-oxidation properties for a long operation time.

DETAILED DESCRIPTION OF THE INVENTION

Figure 1:
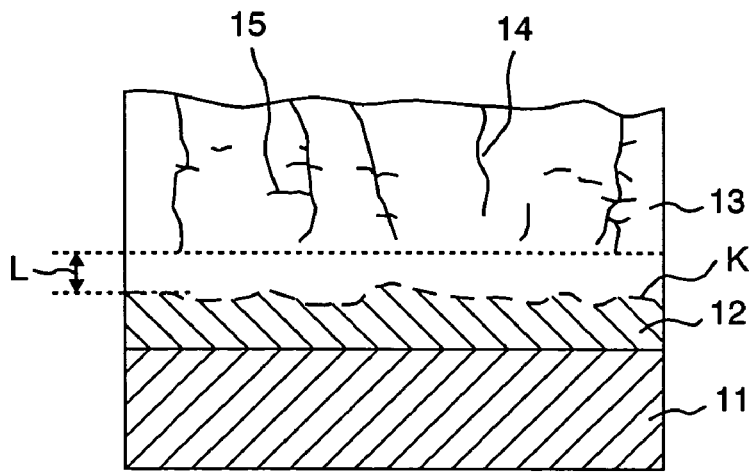
FIG. 1 is a cross sectional view of a ceramic coat according to the present invention.

In order to achieve the above-mentioned object, the present invention provides a heat resistant article comprising a heat resistant alloy substrate whose main components are Ni and Co, a bond coating made of an alloy that is superior in high temperature corrosion resistance to the substrate and a thermal barrier coating made of partially stabilized zirconia and formed on the bond coating, wherein the thermal barrier coating has cracks extending in the direction of thereof, and wherein substantially all of the tips of the cracks at the substrate side are within a range of 10 to 100 μm from the boundary between the bond coating and the thermal barrier coating. The words "substantially all of the cracks" mean "at least 80% of the cracks extending in the direction of the thickness of the barrier the tips of which are within the range of 10 to 100 μm from the boundary".

The number of the cracks extending in the direction of the thickness of the barrier is preferably within a range of from 3 to 10 per 1 mm in a direction perpendicular to the direction of the thickness in a sectional zone. The words "cracks (vertical cracks) extending in the direction of the thickness toward the substrate side from the surface side" mean "cracks on an angle constituted by the direction of the thickness and that of the cracks is zero to 45 degrees and a width of the cracks is 0.1 μm or more". The words "lateral cracks" mean "cracks on an angle constituted by the direction of the thickness and the direction of the lateral cracks is more than 45 degrees to 90 degrees or less and the width of the lateral cracks is 0.1 μm or less".

Accordingly, the typical heat resistant article of the present invention comprises a heat resisting super alloy substrate, a bond coating of a heat resisting alloy formed on the substrate and a ceramic thermal barrier coating formed on the bond coating, wherein the barrier coat comprises a first layer having cracks extending in the direction of its thickness and a second layer having a thickness of 10 to 100 μm and next to the bond coating being substantially free from cracks, and wherein the cracks penetrate through the first layer but do not penetrate the second layer.

A width of the vertical cracks in the barrier is preferably 10 μm or less.

The porosity of the thermal barrier coating is preferably 10% or less.

The main component of the partially stabilized zirconia of the thermal barrier coating is $ZrO_2$ and preferably contains at least one of $Y_2O_3$, MgO, CaO, $CeO_2$, $Sc_2O_3$, $Er_2O_3$, $Gd_2O_3$, $Yb_2O_3$, $Al_2O_3$, $SiO_2$ and $La_2O_3$.

In the present invention, in order to realize the above-mentioned crack conditions, a method of manufacturing the thermal barrier coating is employed wherein heat flux is changed in two steps. That is, a bond coating made of an alloy which is superior in heat resistance and corrosion resistance to the heat resisting substrate is formed on the surface of the substrate. Then, the thermal barrier coating made of partially stabilized zirconia is formed on the substrate.

In forming the thermal barrier coating, a method of manufacturing the thermal resistant article is employed wherein the heat flux generated in the thermal resistant article is changed. The changing of the heat flux is carried out in the first step wherein the thickness of the thermal barrier coating becomes 10 to 100 μm and in the second step wherein an additional thermal barrier coating is formed on the barrier coat. That is, the thermal barrier coating of the present invention consists substantially of two ceramic layers one of which is dense and substantially free from cracks and the other is relatively porous and has cracks (vertical cracks) extending in the direction of the barrier coat, but is substantially free from cracks (lateral cracks) extending in the lateral direction of the barrier coat.

The heat flux in the second step is larger than the first step. In the second step, cracks extending in the direction of the thickness of the barrier coat are formed. In the first step, almost no cracks are formed.

The first step is carried out at such a low heat flux that the cracks are formed, and the second is carried out at such a high heat flux that cracks extending in the direction of the thickness occur.

The present invention related to heat resistant articles for gas turbines such as nozzles, blades, combustors, etc that are exposed to combustion gas, wherein a bonding alloy coat with a superior in heat resistance and corrosion resistance to the substrate is formed on part or the entire surface of the exposed parts and the thermal barrier coating made of partially stabilized zirconia is formed.

FIG. 1 shows a typical diagrammatic cross sectional view of the thermal resistant article having the thermal barrier coating. The thermal barrier coating of the present invention comprises a substrate 11 made of Ni or Co base heat resisting alloy and the thermal barrier coating 13 by means of the bond coating 12. As the bond coating 12, it is preferable to employ an MCrAlY alloy (M is Ni and/or Co), which is superior in heat resistance and corrosion resistance to the base alloy 11. As the thermal barrier coating 13, it is preferable to employ partially stabilized zirconia (such as $ZrO_2$—8 wt % $Y_2O_3$, etc),which is superior in mechanical strength and corrosion resistance to the substrate and has a low thermal conductivity. The thermal barrier coating has cracks extending in the direction of the thickness of the barrier coat from the surface of the barrier coat toward the bond coating with a distance from the substrate (vertical cracks). The distance L in FIG. 1 between the tips of the cracks in the substrate side and the substrate is 10 to 100 μm. Although it is preferable that cracks extending in the lateral direction of the barrier coat do not exist, there may be an inevitable amount of cracks in the region L.

In the ceramic coat of the present invention, there may be many cracks extending in the direction of the thickness of the coat; the cracks extending in the direction of the thickness absorb thermal deformation to effectively relieve the thermal stress.

The barrier coat of the present invention has almost no lateral cracks, stemming from the cracks extending in the thickness direction, extending in the lateral direction in the barrier coat, because the cracks extending in the direction of the thickness do not arrive at the neighborhood by 10 to 100 μm from the boundary K in FIG. 1 between the bond coating and the barrier coat, compared with the conventional barrier coat wherein the cracks penetrate through the entire thickness of the barrier coat. Thus, there are almost no lateral cracks that generate together with the vertical cracks in the barrier coat of the present invention.

Accordingly, the barrier coat in the neighborhood of the boundary has a very high strength thereby to suppress further generation and development of cracks. It is expected that since the vertical cracks do not penetrate through the barrier coat, invasion of corrosive and oxidative substances through the penetrated cracks is blocked. Therefore, damages such as peeling-off of the ceramic barrier coat are hard to occur because of its excellent durability, even when it is utilized for blades, nozzles of gas turbines where they are subjected to combustion gas of very high temperatures. Thus, the barrier coat of the present invention can keep its thermal barrier effect by its nature so that reliability of the substrate that constitutes the articles increases by lowering the temperature and elongates the life.

DETAILED DESCRIPTION OF THE PREFERRED EMBODIMENTS

In the following, the embodiments of the present invention will be explained.

Embodiment 1

A Ni base super alloy (Rene'-80; Ni-14% Cr-4% Mo-3% Al-5% Ti-0.5% Co) of a disc form having a diameter of 25 mm and a thickness of 5 mm was used as a test piece. Powder of MCrAlY alloy (Co-32% Al-21% Cr-8% Al-0.5% Y) was applied to the surface of the test piece by a low pressure plasma spray method to form a metal bond coating.

Figure 2:
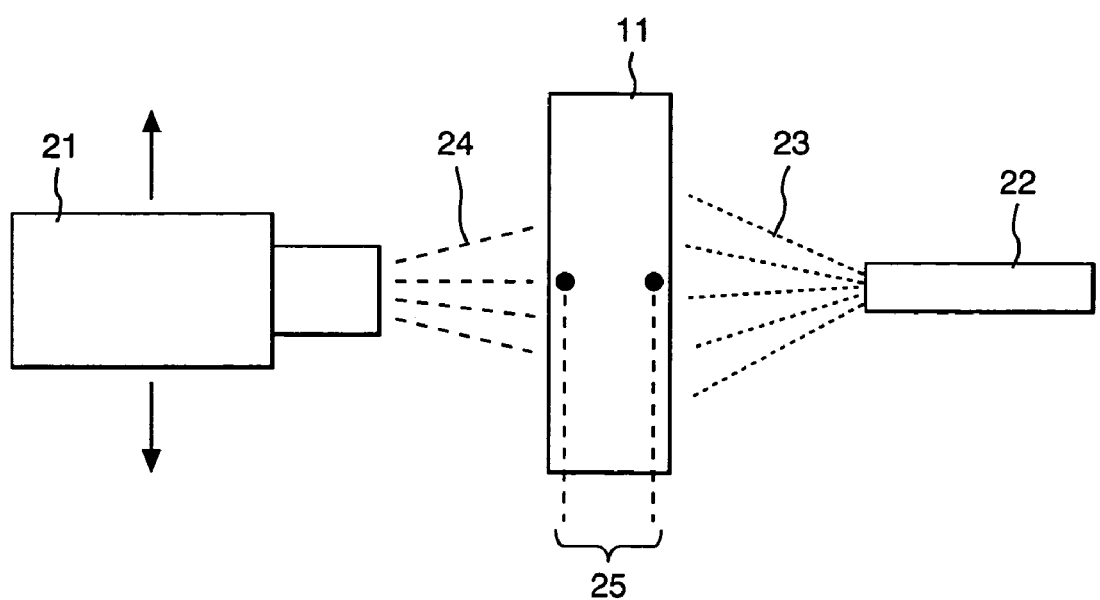
FIG. 2 is a flow chart of a coating process for a ceramic coat according to the present invention.
Figure 3:
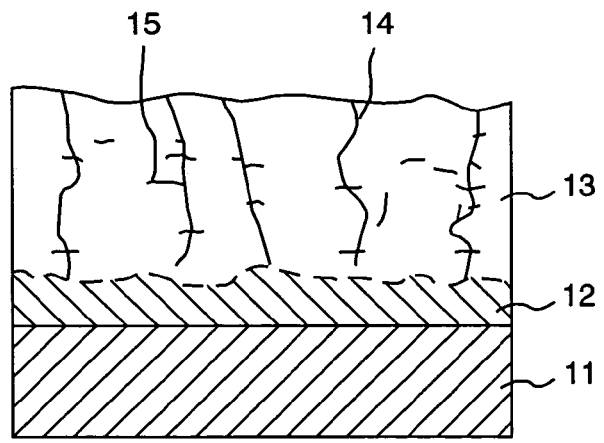
FIG. 3 is a cross sectional view of a conventional ceramic coat having cracks extending in the direction of the thickness of the coat.

The thickness of the metal bond coating was about 100 μm. Then, a thermal barrier coating of the present invention having a thickness of about 500 μm was formed on the bond coating by an atmospheric plasma spray method. The spray conditions were: ceramic powder of $ZrO_2$—8 weight % $Y_2O_3$ was introduced into a plasma jet using a mixed gas of $N_2$—18% $H_2$ (a plasma output: about 100 kW). The spray distance was 90 mm, and the traverse speed of a spray gun was 30 m/min. A thickness per one pass (a thickness of the barrier coat formed by one spray pass) was 50 μm. As shown in FIG. 2, compressed air was blown to the backside face of the test piece during the plasma spray to cool the backside face of the substrate.

Further, a pair of terminals of a thermo-couple 25 was inserted along the center axis of the both surfaces in a depth of 1 mm into the center position of the disc test piece as shown in FIG. 2 so that the temperature of the top surface (heating side) of the disc and the back side face (cooling side) during the plasma spray (the tip distance of the thermo-couple was 3 mm). Under these conditions and the constant plasma spray condition, the heat flux generated in the heat resistant article, that is, the heat flux from the front side face to the back side face of the disc with respect to the relationship between the substrate temperature and the thickness of the barrier coat was measured by changing the amount of cooling air to the back side face.

Figure 7:
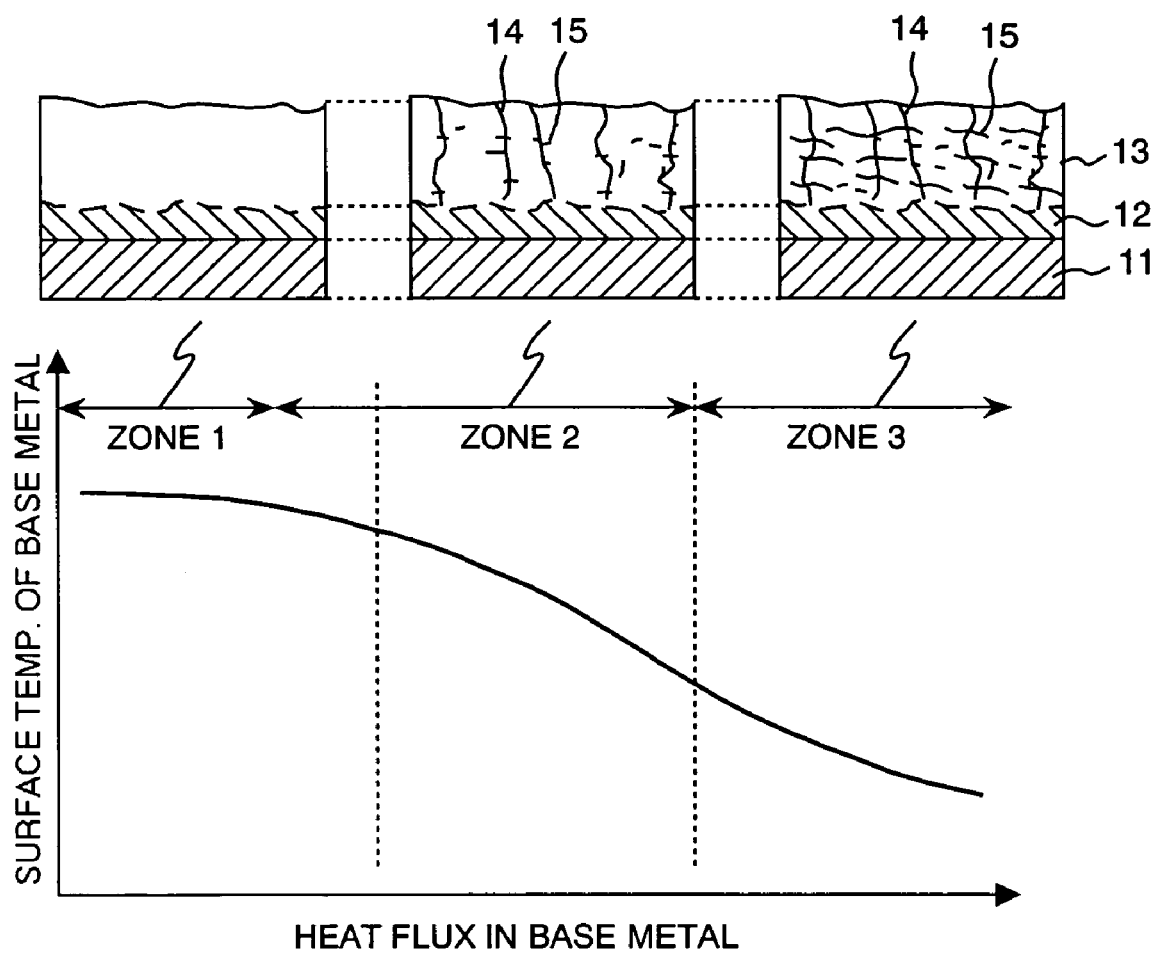
FIG. 7 is a graph showing relationship among heat flux, substrate temperature and structure of ceramic coat. The heat flux is a quantity of flow of heat in the position where there is a temperature difference. The heat flux is expressed as heat energy amount (J) $W/m^2$ (W=J/sec).

The heat flux measured here was presumed and a primary thermal conductivity in the direction of the thickness of the disc was calculated, based on the temperature difference between the two terminals of the thermocouple, the distance thereof and the thermal conductivity of the disc. As a result, it has been found that as shown in FIG. 7, according to the flow rate of the cooling air, the heat flux and the disc temperature were changed, and the structure of the barrier coat was changed in three steps according to the changes of the heat flux and the disc temperature. That is, in zone 1 (zone L) the heat flux was less than about 0.3 $MW/m^2$ (temperature difference in the disc: about 13° C. per 1 mm) where the barrier coat was dense but no cracks extending in the direction of the thickness of the coat occur. In zone 2 heat flux was about 0.3 to 0.6 $MW/m^2$ (temperature difference in the substrate: about 13 to 26° C. per 1 mm) where the barrier coat was dense and there are formed cracks extending in the direction of the thickness of the coat.

In zone 3 the heat flux was more than about 0.6 $MW/M^2$ (the temperature difference in the substrate: about 26° C. per 1 mm) where the barrier coat was porous and cracks extending in the direction of the thickness and in the lateral direction of the coat occur.

The above result was caused by the following mechanism. In the process where the ceramic powder particles sprayed in the molten state deposit on the bond coating by which heat of the molten ceramics is taken away so that the ceramics solidifies to form a laminate. In the state of the zone 1, since an amount of cooling air is small and since the heat flux is small, the solidification speed of the molten ceramics is relatively small so that the-ceramic powder particles bind sufficiently with the accumulated powder particles to make a dense coat. On the other hand, when the heat flux is small, the temperature difference between the front side face and the back side face is small and thermal stress occurring in the surface is small so that the cracks extending in the direction of the thickness of the coat do not occur.

In the state of the zone 2 wherein an amount of cooling air is increased, the heat flux becomes large and the solidification speed of the molten ceramics becomes larger than that of the zone 1. However, in the zone where an increase of the heat flux is limited, the powder particles can sufficiently bind with other particles that accumulate on the previous particles to make a dense coat. On the other hand, the temperature difference between the front side face and the back side face becomes larger than that in the zone 1, and the thermal stress in the surface becomes larger so that cracks extending in the direction of the thickness of the coat begin to occur.

In the zone 3 where an amount of cooling air further increases, the solidification speed becomes too fast and the powder particles cannot bond with the powder particles that accumulate on the particles so that the coat contains a lot of defects and becomes relatively porous. On the other hand, the temperature difference between the front side face and the back side face further increases and the thermal stress in the surface becomes vary large so that cracks extending in the direction of the thickness. And cracks extending in the lateral direction of the coat occur as the starting points of the defects.

In the present invention, a preferable total thickness of the thermal barrier coating and the bond coating is 0.3 to 1.5 mm, though it may change depending on the use conditions of the thermal barrier coating. In the above-mentioned total thickness, a thickness of the thermal barrier coating is preferably 0.2 to 1.0 mm and a thickness of the bond coating is preferably 0.1 to 0.5 mm.

From the result of the above investigation, it is necessary to produce the composition of the coat of the present invention that in the first step to obtain the coat of 10 to 100 μm as the initial coat forming, the coat forming step should be carried out under the conditions in the zone 1, that is, the spray condition is so kept as to maintain the heat flux to be less than 0.3 MW/m$^2$ (the temperature in the substrate: about 13° C per 1 mm), thereby to obtain a coat which is free from cracks and dense. Thereafter, in the second step, which follows the first step continuously, the coat having a desired thickness is formed. In the zone 2, the spray condition is maintained so that the heat flux becomes about 0.3 to 0.6 MW/m$^2$ (temperature difference in the substrate: about 13 to 26° C. per 1 mm) to form the coat having cracks extending in the direction of the thickness.

The conditions for achieving the heat flux to form the zone 1 and zone 2 depend on spray apparatuses, spray conditions, properties of powder material, etc. Therefore, it is impossible to limit the embodiment by the concrete value of the heat flux. For example, if the spray apparatus used in the present embodiment, which has a plasma spray output of about 100 kW is changed to an apparatus with a higher output, the heat flux in the zone 1 may increase (for example, less than 0.5 MW/M$^2$), and the heat flux in the zone 2 may widen (for example, 0.5 to 1 MW/m$^2$). Accordingly, the concrete value of the heat flux should be determined by the relationship between the heat flux and structure of the coat in accordance with the spray apparatus used, spray conditions, powder material used, etc. A spray apparatus with a higher output is preferable because it has a large allowance of spray conditions.

Based on the above investigation, the thermal barrier coating was formed on the disc test piece having the bond coating by the low pressure plasma spray method. At first, the substrate was sufficiently preheated by plasma jet without supplying powder and without cooling the back face. The temperature just after the preheating was about 800° C. After the preheating, the ceramic powder was supplied and the first pass of spray was conducted without cooling the back face. The heat flux at this stage was about 0.1 MW/m$^2$. The spray of the second pass to tenth pass was conducted while cooling the back face by blowing cooling air to the back face.

The amount of the cooling air was determined by a preliminary test so that the heat flux was about 0.4 MW/m$^2$, which is calculated from the temperature difference of the electrodes of the thermocouple buried in the test piece. The sectional area of the thermal barrier coating had such the structure, a shown in FIG. 1, that many cracks 14 extending in the direction of the thickness of the barrier coating and a very few number of inevitable lateral cracks 15 stemmed from the vertical cracks 14. In the sectional structure obtained in this embodiment, the number of the vertical cracks was about 5 per 1 mm along the lateral direction of the barrier coating and the porosity of the barrier coating was about 8%. About 90% of the vertical cracks 14 had a distance of 10 to 100 μm between the tips of the cracks and the boundary between the barrier and the substrate. There was not found lateral cracks in the area between the tips of the cracks and the boundary.

In order to evaluate the heat cycle performance of the TBC of the present invention, the TBC produced by the present invention was subjected to a heat cycle test which consists of heating to 1000° C. in air maintained for 10 hours and cooling to 200° C. The results are shown in Table 1.

TABLE 1

| Test piece | The number of cycles until peeling-off occurs |
|---|---|
| Present invention | 163 |
| Comparison 1 | 84 |
| Comparison 2 | 43 |

In Table 1, there are shown the number of cycles until the peeling-off occurs. The time of the peeling-off was judged as the number of cycles when the area of the peeling-off reaches 20% or more of the whole surface. The comparison example 1 is concerned with TBC test piece having a structure where cracks 14 extending in the direction of the thickness of the ceramic thermal barrier coating 13. In the comparison 1, the piece has the cracks 14 penetrate through the thickness and the cracks 15 stemmed from the vertical cracks 14, which extend in the lateral direction are present. The comparison 2 is concerned with TBC whose thermal barrier coating is a known porous ceramics layer.

As is apparent from Table 1, TBC according to the present invention showed such excellent heat cyclic property that its durability is two times longer than the comparison 1 which is the conventional TBC having cracks extending in the direction of the thickness of the coat, and is 4 times longer than the comparison 2 of the conventional TBC. The test pieces picked up after 80 cycles were subjected to observation of the sectional areas of the test pieces. As a result, it was confirmed that cracks extending in the direction of the thickness and that the tips of the cracks are remote from the boundary between the barrier coat and the substrate by 10 to 100 μm wherein the number of the cracks within the above range is about 70% of the whole cracks.

On the other hand, in the comparison 1, cracks newly occur in the lateral direction from the tips of the vertical cracks and lateral cracks derived from the vertical cracks occur. Particularly, the occurrence of the lateral cracks at the position near the boundary was remarkable. The test pieces of comparison 1 and 2 had oxide layers caused by growth of the bond coatings at the boundary between the substrate and the bond coating.

The thickness of the grown oxide layer in the test piece of comparison 1 was about 20 to 30 μm, though the thickness of the grown oxide layer of the test piece of the present invention was about 10 μm. From these results, it has been revealed that in the thermal barrier coating of the present invention, the dense and high strength region (L in FIG. 1 or zone 1 in FIG. 7) which is substantially free from cracks prevents occurrence and progress of lateral cracks. Further, the region prevents oxidation of the metal bond coating, which is caused by invasion of oxygen through cracks penetrating through the barrier coat.

The test pieces made of a Ni base single crystal material (SC, CMX-4; Ni-6.6% Cr-0.6% Mo-6.4% W-3.0% Re-5.6% Al-1.0% Ti-6.5% T-9.6% Co) and a directional solidification Ni base super alloy (DS, Mar-M247; Ni-16% Cr-1.8% Mo-2.6% W-3.4% Al-3.4% Ti-1.7% Ta-8.5% Co-0.1% C) were subjected to the same tests. Almost the same results as those of the above-mentioned alloy were obtained. From the results, it was confirmed that TBC of the present invention brought about the same advantages to the SC alloy and DS alloy.

The coating conditions explained above are typical examples; the embodiments of the present invention would not be limited by the examples.

Embodiment 2

The present inventors prepared a ceramic coating gas turbine blade based on the test results using the fundamental test pieces of the embodiment 1. In the following, this will be explained.

Figure 4:
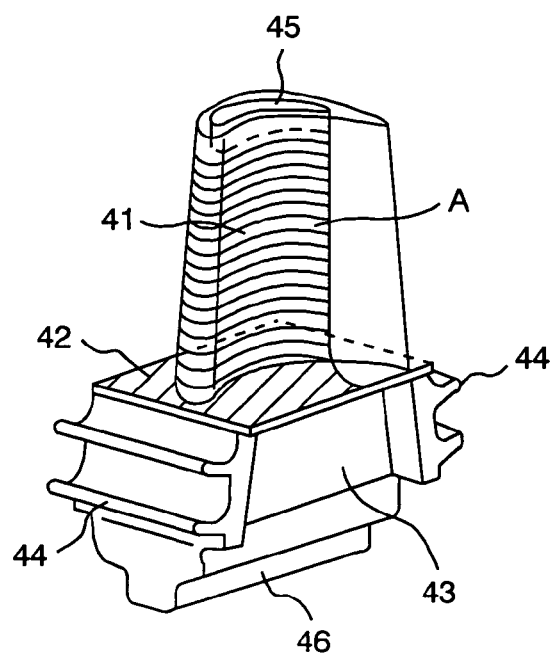
FIG. 4 is a perspective view of a blade according to the present invention.

The perspective view of the gas turbine structure is shown in FIG. 4. In this drawing, the gas turbine blade is made of Ni base heat resisting super alloy (Rene'-80), which is used as the first stage blade, for example. The blade structure comprises the blade 41, a platform section 42, a shank portion 43, a seal fin 44 and a tip pocket 45. The structure is fitted by means of a dovetail 45 to a rotor disc. The blade has a blade length of 100 mm and a length from the platform to the end is 120 mm. The blade has a cooling hollow (not shown), which is formed from the dovetail 46 through the blade 41 to cool it with air or steam. Although the ceramic coated blade is most suitable for the first stage blade, it can be used for second stage blade and others. The thermal barrier coating A that was investigated in the embodiment 1 was formed on the part of the blade 41 and the platform 42 which are exposed to combustion gas.

The method of forming the coat was almost the same as in the embodiment 1. The MCrAlY alloy (Co-32% Ni-21% Cr-8% Al-0.5%Y) was sprayed on the surface of the blade by the low pressure plasma spray method to form the metal bond coating having a thickness of about 100 μm; then the thermal barrier coating having a thickness of about 500 μm was formed on the bond coating by the atmospheric plasma spray method at a plasma output of about 100 kW. In applying the spray to the blade, the spray conditions were slightly changed because the thermal capacity of the blade was larger than that of the test pieces used in the embodiment 1.

In the second step of the embodiment 1 using the small sized test piece, the test pieces were cooled from the backside face to obtain the heat flux of 0.3 to 0.6 MW/m$^2$, thereby to generate cracks extending in the direction of the thickness of the coat. However, in case where the coat is formed on the work such as blades having a sufficiently large thermal capacity, self-cooling effect by heat conduction within the work and heat dissipation from the portions, which are not heated by plasma, is expected without particular cooling. As a result, the sufficient heat flux for generating the cracks extending in the direction of the thickness in the second step is obtained.

In the second step, however, if the spray conditions are the same as those of the first step, it is difficult to realize the heat flux of less than 0.3 MW/m$^2$ that is necessary to obtain the crack free and dense layer (L or zone 1). As for the countermeasure, in the processing the actual blades the spray conditions in the preheating and the first step (a traverse speed of the plasma spay gun, a spray distance, an output of the gun, etc) are controlled so as to increase input heat to the work thereby to heat the neighborhood of the spray spot. As a result, the temperature difference between the spray spot and its neighborhood is made as small as possible so that the self-cooling effect due to the thermal conduction within the work is suppressed.

In the actual processing, a blade for measuring temperature that has a pair of thermo-couples buried in main portions in the front side face and back side face was prepared. The spray conditions during spraying were adjusted by measuring temperatures. In the first step (preheating and first pass of spray), the traverse speed of plasma spray gun was changed from 30 m/min of the embodiment 1 to 20 m/min and the spray distance was changed from 90 mm to 85 mm to obtain a predetermined heat flux of about 0.2 MW/m$^2$. Thereafter, in the second step (after the first pass), the spray was carried out under the same conditions as those in embodiment 1 to obtain the heat flux of about 0.4 MW/m$^2$ thereby to produce TBC having the same structure as that of embodiment 1.

Figure 6:
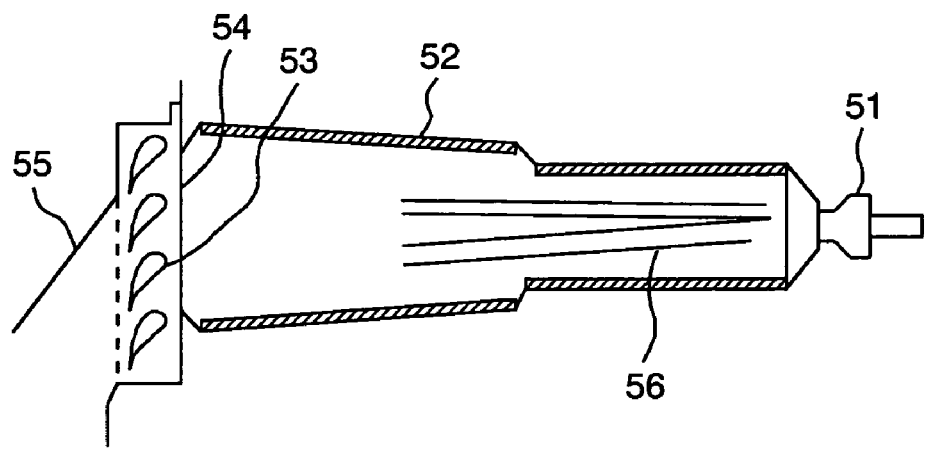
FIG. 6 is a diagrammatic view of a simulation test apparatus for actual blade row.

Using the gas turbine blade produced in the above-described method, a thermal load test was conducted with a simulation heating test machine shown in FIG. 6. Testing conditions are: the maximum combustion gas temperature is 1500° C.; a cooling air temperature is 170° C.; a pressure is 8 ata. In this test, the blade temperature was measured by the thermocouple buried in the edge of the blade under the condition that the blade is heated to obtain the heat flux. The maximum value was 3.2 MW/m$^2$. For comparison, as same as comparison 1 in embodiment 1, a turbine blade having a metal bond coating (a thickness of about 100 μm) and a thermal barrier coating having cracks penetrating through the barrier coat and cracks extending in the lateral direction (a thickness of about 500 μm) was prepared.

When the combustion gas temperature is 1000° C. (heat flux: 0.8 MW/m$^2$), both the turbine blade of the present invention and the turbine blade of comparison showed no change after 10 times repetition cycles of start, rated operation and stop did not show any damage on TBC. However, when the combustion gas temperature is 1300° C. (heat flux: about 1.5 MW/m$^2$), the turbine blade of the present invention was sound after ten cycles, while the turbine blade of the comparison showed peeling-off damage on a part of the ceramic coat.

When the combustion gas temperature is 1500° C. (heat flux: 3.2 MW/m$^2$), the turbine blade of the present invention was quite sound after 10 cycles, while the turbine blade of the comparison showed a further developed damage on the ceramic coat. As is apparent from the above-described facts, the turbine blade with the thermal barrier coating according to the present invention is superior in durability to the turbine blade with the conventional thermal barrier coating.

Figure 5:
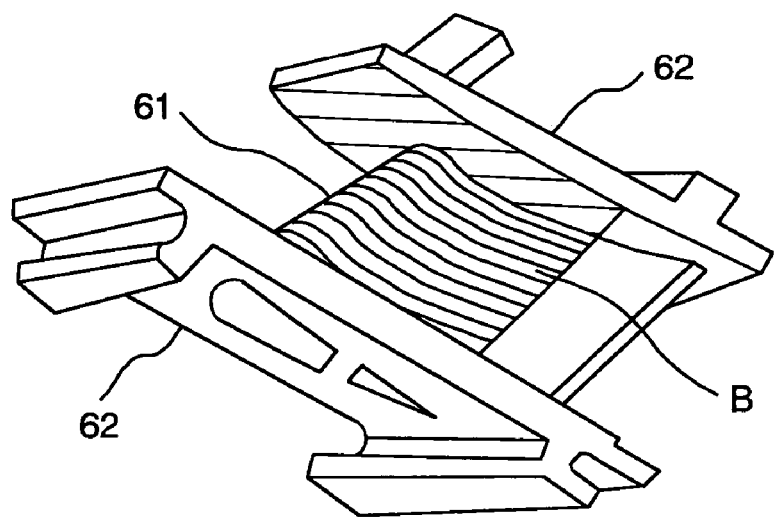
FIG. 5 is a perspective view of a ceramic coat nozzle according to the present invention.

The present inventors prepared a ceramic coated gas turbine nozzle of the present invention, based on the fundamental tests of the embodiment 1. This will be explained in the following. FIG. 5 shows a whole structure of the gas turbine nozzle of the present invention. In FIG. 5, the gas turbine nozzle is made of a Co base heat resisting super alloy (FSX414), and is used as the first stage nozzle of a gas turbine having nozzles of three stages, for example. The nozzle has a blade 61 and endwalls 62. The endwalls 62 are provided with cooling apertures (not shown) for cooling the inside of the nozzle with a cooling medium such as air or steam at the edge of the endwall though blade 61. The ceramic coated nozzle is particularly suitable for the first stage nozzle, but it can be utilized for other stages nozzles. TBC B investigated in embodiment 1 was applied to the top end of the blade 61 and inside of endwalls 62 exposed to combustion gas.

The coating method was almost the same as that of embodiment 2. The MCrAlY alloy (Co-32% Ni-8%-Al-0.5% Y) powder was sprayed on the surface of the nozzle as a bond coating of a thickness of about 100 μm by a low pressure plasma spray method, then the thermal barrier coating of the present invention was applied on the bond coating of a thickness of about 500 μm. In applying the coat to the nozzle, as same as application to the blade in embodiment 2, the traverse speed of the spray gun in the first step was changed from 30 m/min in embodiment 1 to 18 m/min and the spray distance was changed from 90 mm to 80 mm so that a predetermined heat flux of about 0.2 MW/m$^2$ was obtained. Thereafter, the spray conditions after the first pass were returned to the original, as same as in embodiment 1, to obtain TBC having the similar structure on the nozzle.

The thus prepared nozzle was subjected to a thermal load test by a simulation heating test method shown in FIG. 6. Test conditions are: the maximum combustion gas temperature is 1500° C., a cooling air temperature is 170° C., and a pressure is 8 ata. In the test, a thermo-couple was buried in the tip end portion of the nozzle to measure the heat flux under the condition that the nozzle was kept under heating. The heat flux was 3.0 MW/M$^2$ as the maximum value. For comparison, a nozzle was prepared wherein the cracks penetrate through the ceramic coat of about 500 μm in thickness and the metal bond coating of about 100 μm in thickness.

The test results showed that when the combustion gas temperature is 1500° C. (heat flux: 3.0 MW/m$^2$), the nozzle of the present invention was quite sound, but the comparative nozzle showed damage of the coat on the tip end. From this result, it has revealed that the nozzle having the thermal barrier coating of the present invention is superior to the nozzle having the conventional barrier coat.

The present invention can be applied to particle erosion resistant coat for gas turbines, etc wherein combustion gas contains solid particles such as combustion ash because the surface of the ceramic coat is very dense and tough. Further, the present invention can be applied to anti-corrosion coat for gas turbines, etc wherein low grade fuels being very corrosive are used because the cracks extending in the direction of the thickness of the coat do not penetrate through the coat to prevent corrosive and oxidative substances from invading into the boundary between the substrate and the bond coating.

What is claimed is:

1. A heat resistant article comprising
   a heat resisting alloy substrate,
   a bond coating of a heat resisting alloy formed on the substrate, the bond coating being superior in heat resistance and corrosion resistance to the substrate, and
   a ceramic thermal barrier coat formed by a plasma spray coating on the bond coating, the barrier coat having cracks extending in the direction of its thickness, wherein substantially all of tips of the cracks are present at a distance of 10 to 100 μm from the boundary between the bond coating and the barrier coat, and wherein the barrier coat is porous, and wherein the porosity of the barrier coat is 10% or less.

2. The heat resistant article according to claim 1, wherein the number of the cracks within a cross sectional area in the direction from the surface of the barrier coat to the substrate is 3 to 10 per 1 mm in the direction perpendicular to the above direction.

3. The heat resistant article according to claim 1, wherein the ceramic thermal barrier coat comprises a partially stabilized zirconia containing ZrO$_2$ as a main component and at least one of Y$_2$O$_3$, MgO, CaO, CeO$_2$, Sc$_2$O$_3$, Er$_2$O$_3$, Gd$_2$O$_3$, Yb$_2$O$_3$, Yb$_2$O$_3$, Al$_2$O$_3$, SiO$_2$ and La$_2$O$_3$.

4. A gas turbine having the heat resistant article according to claim 1. The heat resistant article according to claim 1, wherein the thermal barrier coat, formed by a plasma spray coating, comprises at least two layers, a first layer, adjoining to the bond layer, being dense and being substantially free from cracks and a second layer, formed on the first layer, being less dense than the first layer and having the cracks.

5. A gas turbine having the heat resistant article according to claim 1.

6. The heat resistant article according to claim 1, wherein the bond coating is formed by a plasma spray coating.

7. The heat resistant article according to claim 1, wherein the thermal barrier coating comprises three layers, a first layer, adjoining to the bond layer, being dense and substantially free from cracks, a second layer formed on the first layer having cracks, and a third layer being porous and having the cracks.

8. The heat resistant article according to claim 1, wherein the bond coating is made of MCrAlY (M is Ni and/or Co) alloy.

9. A heat resistant article comprising a bond coating of a heat resistant alloy formed on a surface of a substrate whose main components are Ni and Co and a thermal barrier coat of partially stabilized zirconia formed on the bond coating, wherein the barrier coat has cracks extending in the direction of its thickness, substantially all of tips of the cracks being present at a distance of 10 to 100 μm from the boundary between the bond coating and the barrier coat, and wherein the thermal barrier coat, formed by a plasma spray coating, comprises at least two layers, a first layer, adjoining to the bond layer, being dense and being substantially free from cracks and a second layer, formed on the first layer, being less dense than the first layer and having the cracks, and wherein the barrier coat is porous, and wherein the porosity of the barrier coat is 10% or less.

10. The heat resistant article according to claim 9, wherein the number of the cracks within a cross sectional area in the direction from the surface of the barrier coat to the substrate is 3 to 10 per 1 mm in the direction perpendicular to the above direction.

11. The heat resistant article according to claim 9, wherein the partially stabilized zirconia contains ZrO$_2$ as a main component and at least one of Y$_2$O$_3$, MgO, CaO, CeO$_2$, Sc$_2$O$_3$, Er$_2$O$_3$, Gd$_2$O$_3$, Yb$_2$O$_3$, Yb$_2$O$_3$, Al$_2$O$_3$, SiO$_2$ and La$_2$O$_3$.

12. A gas turbine having the heat resistant article according to claim 9.

13. The heat resistant article according to claim 9, wherein the bond coating is formed by a plasma spray coating.

14. The heat resistant article according to claim 9, wherein the barrier coating comprises three layers, a first layer, adjoining to the bond layer, being dense and substantially free from cracks, a second layer formed on the first layer having cracks, and a third layer being porous and having the cracks.

15. The heat resistant article according to claim 9, wherein the bond layer is superior in heat resistance and corrosion resistance to the substrate.

16. The heat resistant article according to claim 9, wherein the bond coating is made of MCrAlY (M is Ni and/or Co) alloy.

17. A heat resistant article comprising a heat resisting super alloy substrate, a bond coating of a heat resisting alloy formed on the substrate and a ceramic thermal barrier coat formed by a plasma spray coating on the bond coating, wherein the barrier coat comprises a first layer having cracks extending in the direction of its thickness and a second layer having a thickness of 10 to 100 μm and next to the bond coating, said second layer being substantially free from cracks, and wherein the cracks penetrate through the first layer but do not penetrate the second layer, and wherein the barrier coat is porous, and wherein the porosity of the barrier coat is 10% or less.

18. A heat resistant article comprising
    a heat resistant alloy substrate;
    a bond coating of a heat resisting alloy superior in heat resistance and corrosion resistance to the substrate; and a ceramic thermal barrier coat, formed by a plasma spray coating, having cracks extending in its thickness, wherein the thermal barrier coat comprises at least two layers, a first layer, adjoining to the bond coating, being dense and substantially free from cracks, and a second layer being less dense than the first layer and having cracks extending in its thickness, and wherein the barrier coat is porous, and wherein the porosity of the barrier coat is 10% or less.

19. The heat resistant article according to claim 18, wherein the bond coating is formed by a plasma spray coating.

20. The heat resistant article according to claim 18, wherein the bond coating is made of MCrAlY (M is Ni and/or Co) alloy.

* * * * *